(12) United States Patent
Naito et al.

(10) Patent No.: US 9,048,553 B2
(45) Date of Patent: Jun. 2, 2015

(54) CARD SOCKET WITH HEAT SINK

(75) Inventors: Yuji Naito, Kanagawa (JP); Mitsuhiro Tomita, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 154 days.

(21) Appl. No.: 13/991,450

(22) PCT Filed: Dec. 6, 2011

(86) PCT No.: PCT/IB2011/003365
§ 371 (c)(1),
(2), (4) Date: Jul. 24, 2013

(87) PCT Pub. No.: WO2012/110849
PCT Pub. Date: Aug. 23, 2012

(65) Prior Publication Data
US 2013/0295792 A1 Nov. 7, 2013

(30) Foreign Application Priority Data
Dec. 7, 2010 (JP) .................... 2010-272638

(51) Int. Cl.
*H01R 13/62* (2006.01)
*H01R 13/00* (2006.01)
*G06F 1/20* (2006.01)
*H01R 12/71* (2011.01)
*H01R 13/506* (2006.01)

(52) U.S. Cl.
CPC *H01R 13/00* (2013.01); *G06F 1/20* (2013.01); *H01R 12/712* (2013.01); *H01R 13/506* (2013.01)

(58) Field of Classification Search
CPC ..................... H01R 23/684; H01R 23/682
USPC ............... 439/331, 630, 376, 341, 326
See application file for complete search history.

(56) References Cited

U.S. PATENT DOCUMENTS

| | | | |
|---|---|---|---|
| 6,278,610 B1* | 8/2001 | Yasufuku et al. | 361/704 |
| 6,447,303 B1 | 9/2002 | Kihira et al. | |
| 6,890,202 B2* | 5/2005 | Yasufuku et al. | 439/331 |
| 7,473,115 B2* | 1/2009 | Yu et al. | 439/188 |
| 7,488,191 B2* | 2/2009 | Nakase et al. | 439/157 |
| 8,167,643 B2 | 5/2012 | Yoshida et al. | |
| 2002/0031948 A1 | 3/2002 | Kaori et al. | |
| 2007/0097625 A1 | 5/2007 | Yong et al. | |

FOREIGN PATENT DOCUMENTS

JP 61-24976 U 2/1986
JP 2009-146701 7/2009

* cited by examiner

*Primary Examiner* — Phuongchi T Nguyen

(57) ABSTRACT

A card connector that includes a housing that houses a card provided with a terminal member, a connecting terminal attached to the housing that connects with the terminal member of the card, a cover member connected to the housing and which forms a card housing space between the housing, a card connector attached to a substrate. The cover member includes a top panel part, a plurality of side panel parts established from the side edge of the top panel part, and a fixed side that extends from the bottom end edge of the side panel part. At least one of the fixed sides is connected to a heat transfer pad arranged on the substrate. The top panel part contacts the top surface of the card housed within the card housing space and is provided with a heat transfer improving part that improves heat transfer from the card to the top panel part.

20 Claims, 12 Drawing Sheets

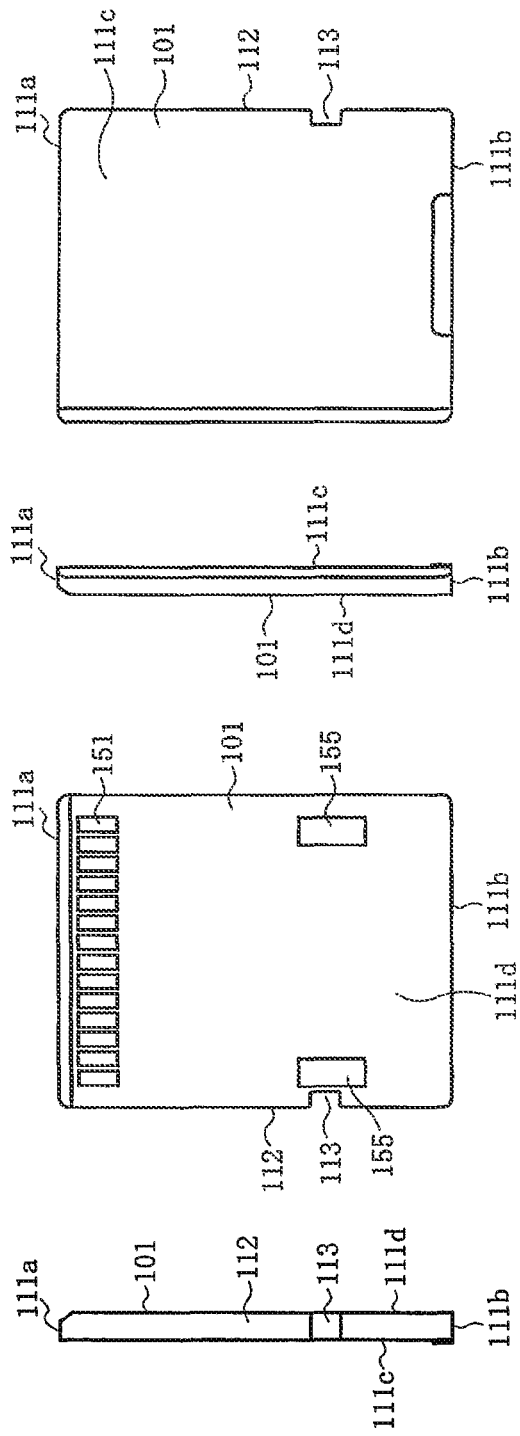

FIG. 6A
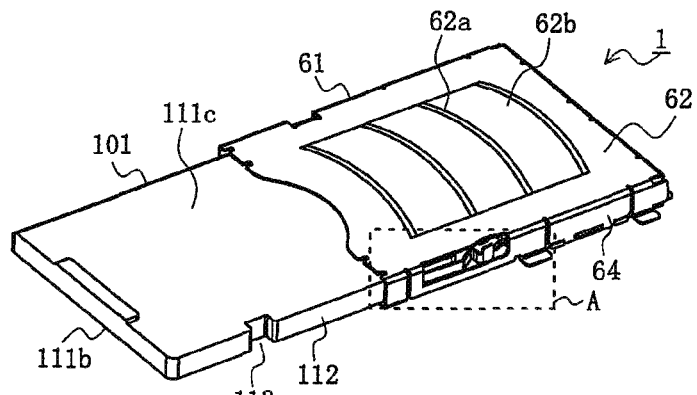
FIG. 6B
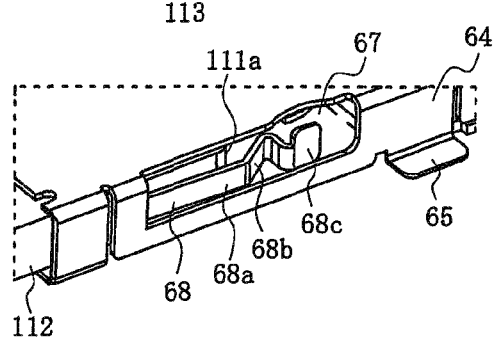
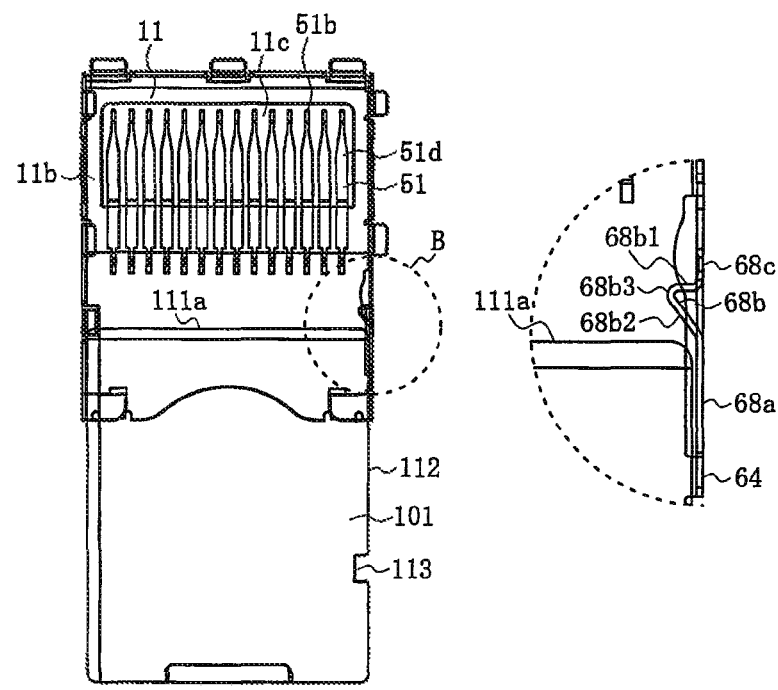
FIG. 6C          FIG. 6D

FIG. 10A
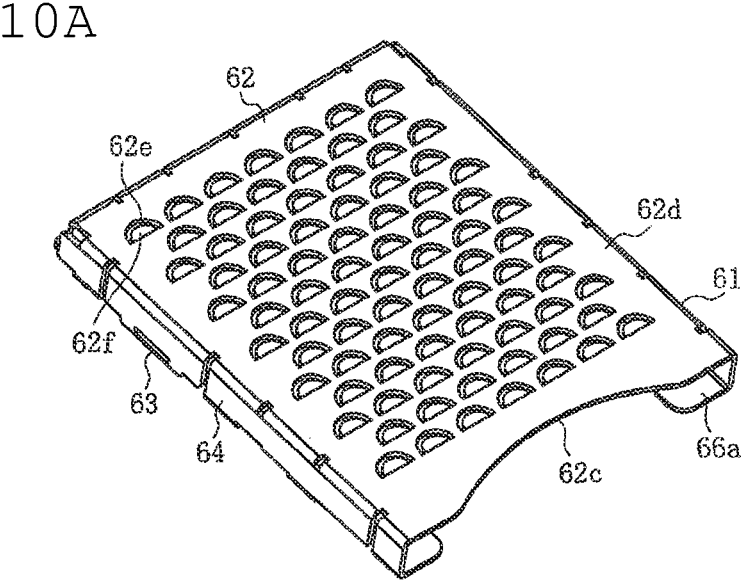
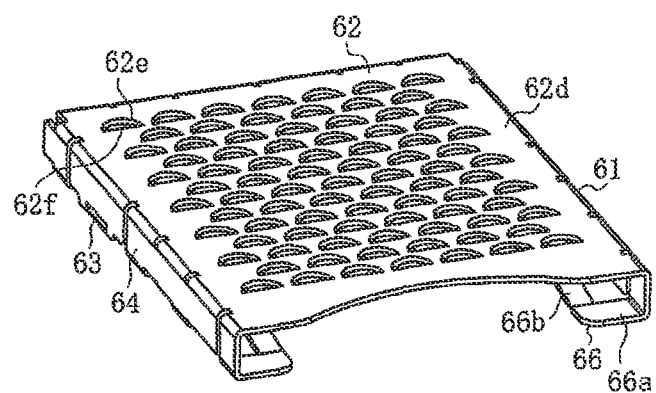
FIG. 10B

CARD SOCKET WITH HEAT SINK

REFERENCE TO RELATED APPLICATIONS

The Present Disclosure claims priority to Japanese Patent Application No. 2010-272638, filed Dec. 7, 2010 and PCT Application No. PCT/IB2011/003365, filed Dec. 6, 2011. The content of the aforementioned patent applications are fully incorporated in their entirety herein.

BACKGROUND OF THE PRESENT DISCLOSURE

The Present Disclosure relates, generally, to a card connector, and, more particularly, to a card connector that can rapidly remove the heat generated by the card with a simple construction, a small size, easy manufacturing, low cost, and excellent reliability.

Conventional electronic devices have been provided with card connector to use various types of memory cards. Further, from an ease-of-use perspective, such card connectors have generally adopted a push/push structure that operates so as to push a memory card both when inserting the memory card as well as when extracting the memory card. An example of this card connector is disclosed in Japanese Patent Application No. 2009-146701, the content of which is fully incorporated in its entirety herein.

FIG. 12 illustrates a conventional card connector. In the Figure, 811 is a housing of a card connector made from an insulating material, and a plurality of connection terminals 851 made of metal are provided. Further, 861 is a shell of the card connector and is made from a metal plate that attaches to the upper side of the housing 811. Also, a memory card 901 is inserted into the space between the shell 861 and the housing 811 so that the contact pads 951 of the memory card 901 contact the corresponding connection terminals 851.

In the example illustrated in FIG. 12, the card connector is a so-called push/push type connector and has a guide mechanism that ejects the memory card 901. The guide mechanism engages with the memory card 901 and is provided with a sliding member 821 that slides together with the memory card 901 and is provided with a coil spring 881 that energizes the sliding member 821 in a direction to reject the memory card 901.

Further, a cam groove of a heart cam mechanism is formed on the top surface of the sliding member 821 and one end of the pin member 871 of the heart cam mechanism is engaged in the cam groove. Note, the pin member 871 is held by being biased in the downward direction from the top by a leaf spring 865 of the shell 861. In addition, the sliding member 821 provides a lever 822 formed by an engagement part 823 that engages with an engaging recessed part 912 of the memory card 901. Also, when the memory card 901 is pushed into the housing 811, the memory card 901 is pushed into the interior direction (upper right direction in FIG. 12) of the housing 811. In doing so, the engaging recessed part 912 of the memory card 901 engages with the engagement part 823 of the lever 822 of the sliding member 821, and the sliding member 821 moves in the interior of the housing 811 together with the memory card 901 in opposition to the repulsive force of the coil spring 881. Further, one end of the pin member 871 latches to the cam grove of the heart cam mechanism by the action of the heart cam mechanism and when the sliding member 821 stops, the memory card 901 also stops in an inserted state within the housing 811.

Next, when the memory card 901 is pushed to remove the memory card 901 from the housing 811, the latched state of one end of the pin member 871 in the cam groove of the heart mechanism is released. By this, the sliding member 821 is released and moves to the front direction (lower left direction in the drawing) together with the memory card 901 by the force exerted by the coil spring 881, and thus the memory card 901 is ejected from the housing 811.

SUMMARY OF THE PRESENT DISCLOSURE

However, strategies for heat dissipation have not been sufficiently implemented in conventional card connectors. In recent years, in conjunction with smaller electronic devices with higher performance, efforts have been made to reduce the size of the memory card together with increasing the capacity of the memory card while increasing the speed of the transfer rate for the input and output of data by the memory card. Therefore, because the component mounting density has increased within electronic devices thereby reducing open space regardless of the increase in heat generated by the memory card, ventilation conditions around the card connector have worsened thereby reducing the ability for heat dissipation and thus the temperature of the memory card increases. Although the temperature increase can be prevented in the memory card by arranging a cooling device, arranging such a device would require increasing the size of the electronic device as well as increasing the cost.

An object of the Present Disclosure is to provide a highly reliable card connector that can solve the problems in conventional card connectors, and rapidly remove the heat generated by the card with a simple construction, a small size, easy manufacturing, and low cost. Therefore, the card connector of the Present Disclosure is a card connector that includes a housing that houses a card provided with a terminal member, a connecting terminal attached to the housing that connects with the terminal member of the card, a cover member connected to the housing and which forms a card housing space between the housing, and a card connector attached to a substrate. The cover member includes a top panel part, a plurality of side panel parts established from the side edge of the top panel part, and a fixed side that extends from the bottom end edge of the side panel part. At least one of the fixed sides is connected to a heat transfer pad arranged on the substrate. The top panel part contacts the top surface of the card housed within the card housing space and is provided with a heat transfer improving part that improves heat transfer from the card to the top panel part.

In another card connector of the Present Disclosure, the cover member is provided with a card retention tab that is connected to the bottom end edge of the side panel part, and the card retention tab upwardly biases the bottom surface of the card housed in the card housing space and abuts the top surface of the card on the heat transfer improving part. In still another card connector of the Present Disclosure, the heat transfer improving part is a protruding spring part that protrudes facing downward separated from the peripheral part of the top panel part by slits.

In another card connector of the Present Disclosure, the protruding spring part is connected to the peripheral part by both ends and is an expansion spring with a simply supported beam shape that extends in the width direction of the cover member, and the center thereof is provided in an arched band-like shape protruding toward the insertion direction of the card. In still another card connector of the Present Disclosure, the protruding spring part is a raised leaf part formed in a fish scale pattern and the opposite side end of the insertion direction of the card is connected to the peripheral part, and the insertion direction side end of the card protrudes facing downward.

In another card connector of the Present Disclosure, the card provides a heat dissipation pad arranged on the bottom surface thereof, and the card retention tab abuts the heat dissipation pad. In still another card connector of the Present Disclosure, the terminal member is arranged on the bottom surface on the front end side half portion on the card, and is upwardly biased by the connection terminal; and the heat dissipation pad is arranged on the bottom surface on the rear end side half portion on the card, and is upwardly biased by the card retention tab.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 5 are four orthogonal views of a card to be inserted into the card connector of FIG. 1, where (a) is a right side face view, (b) is a bottom face view, (c) is a left side face view, and (d) is a top face view;

FIG. 6 illustrate a midway state of inserting the card into the card connector of FIG. 1, where (a) is a perspective view, (b) is an enlarged view of the A part in (a), (c) is a perspective plan view, and (d) is an enlarged view of the B part in (c);

FIG. 10 is a perspective view of a shell of a card connector according to one embodiment of the Present Disclosure diagonally viewed from above, where (a) and (b) are views from mutually different angles;

DESCRIPTION OF THE PREFERRED EMBODIMENTS

Figure 1A:
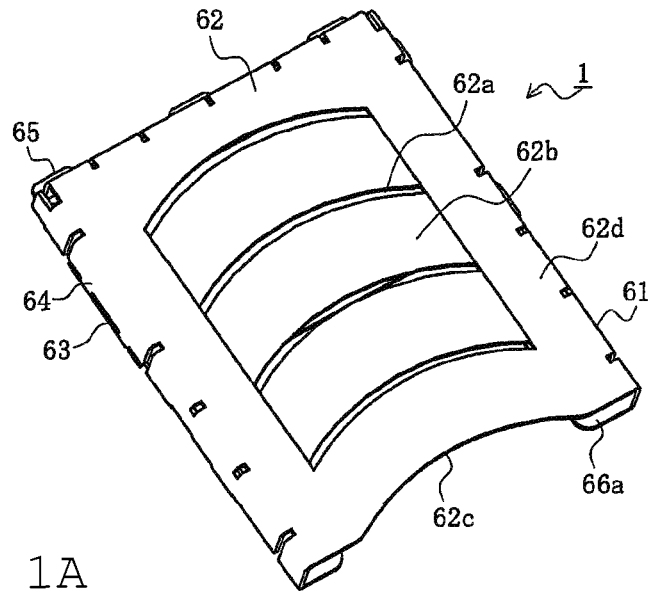
FIG. 1 is a perspective view illustrating a card connector according to one embodiment of the Present Disclosure, where (a) is a view seen diagonally from the upper front side, and (b) is a view seen diagonally from the bottom.

While the Present Disclosure may be susceptible to embodiment in different forms, there is shown in the Figures, and will be described herein in detail, specific embodiments, with the understanding that the disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to the Figures, 1 is a card connector surface-mounted to attach to a substrate 91 such as a printed circuit board, a flexible printed circuit board (FPC) or the like provided by an electronic device (not illustrated). The card 101 is inserted into the card connector 1, and the card 101 is loaded into the electronic device through the card connector 1. The card 101 has a nearly rectangular plate shape, as illustrated in FIG. 5, and a contact pad 151 is arranged as a plurality of terminal members so as to be in line along a front end 111a on the bottom surface 111d near the front end 111a. In addition, heat dissipation pads 155 are arranged as a pair of heat dissipation members to the bottom surface 111d of the portion near the back end 111b. Moreover, the contact pads 151 as well as the heat dissipation pads 155 are not arranged on the top surface 111c. In addition, at least one recessed part 113 is formed in the latter half portion (a part nearer to the back end 111b than the middle point between the front end 111a and the back end 111b) on at least one side of the side edges 112 that joins the front end 111a with the rear end 111b. Here, for convenience of description, a description will be given of an example where only one recessed part 113 is formed in the latter half portion on the right side edge 112.

Here, the card connector 1 is provided with an integrally-formed housing 11 composed of an insulating material, terminals 51 as a plurality of connecting terminals attached to the housing 11 and that are formed integrally by stamping a plate material composed of a conductive material and undergoing a folding process, and a shell 61 as a cover member attached to the upper side of the housing 11 and that is formed integrally by stamping a plate material composed of a conductive material and undergoing a folding process. The shell 61 covers the housing 11 and the upper side of at least one part of the card 101 housed in the housing 11. The card connector 1 is roughly a flat rectangular parallelepiped shape that attaches to the electronic device. The card 101 is inserted into the card housing space formed between the housing 11 and the shell 61 from the front side (lower right side in FIG. 1 (a) and upper right side in FIG. 1 (b)). In addition, the terminals 51 are typically integrally formed with the housing 11 by overmolding.

Figure 2:
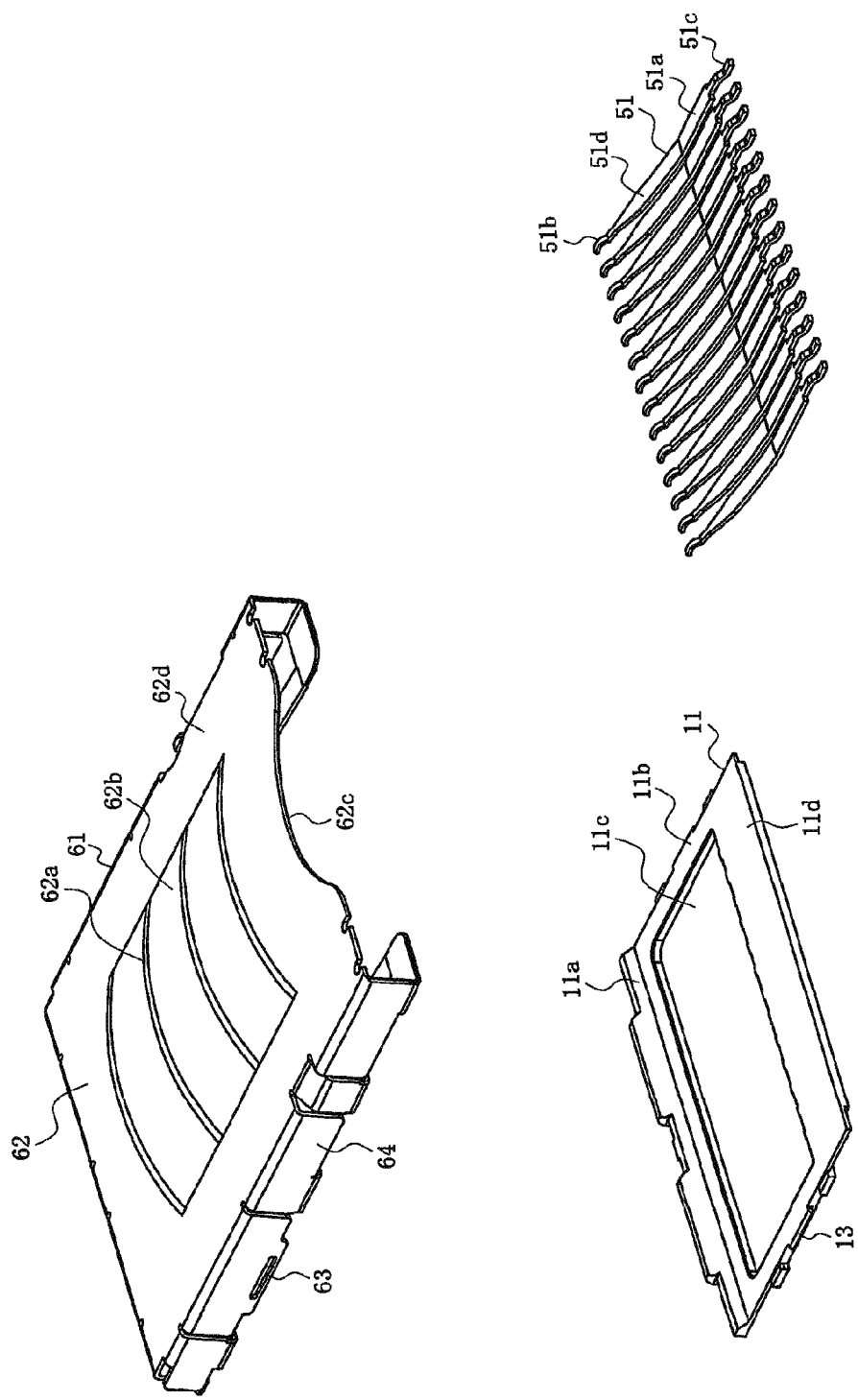
FIG. 2 is an exploded view of the card connector of FIG. 1.

As shown in the Figures, the housing 11 has a bottom wall part 11b with a substantially rectangular plate-like shape, and a back wall part 11a that is installed from the bottom wall part 11b, and extends along the edge of the back side (left upper side in FIG. 2) on the back part of the bottom wall part 11b.

Here, the bottom wall part 11b is provided with a terminal retention part 11d where the terminals 51 are attached as connecting terminals to the upper surface. The terminals 51 may be integrated with the terminal retention part 11d by overmolding; however, a plurality of terminal load grooves may be formed on the top side of the terminal retention part 11d so as to extend in the front-back direction (direction that connects the upper left and lower right in FIG. 2), and the terminals 51 may be inserted and attached in each terminal loading groove.

The terminals 51 are long and thin strip-shaped members extending in parallel in the front-back direction, and arranged in parallel so as not to contact each other between adjacent terminals. Each terminal 51 includes a main body 51a that extends in the front-back direction, an arm part 51d that extends forward from the front end of the body 51a, a contact part 51b that connects to the tip of the arm part 51d, and a tail part 51c as the solder tail part extending backward from the back end of the main body 51a. Also, for the terminals 51, the main body 51a is attached to the terminal retention part 11d, and the arm part 51d extends diagonally upward towards the back wall part 11a, and the contact part 51b that is connected to the tip of the arm part 51d protrudes upward from the top surface of the bottom wall part 11b. The contact part 51b of each terminal 51 is electrically connected by contacting the contact pad 151 that corresponds to the bottom surface 111d of the card 101. Further, the tail part 51c protrudes towards the front side from the edge of the front side of the bottom wall part 11b, and is electrically connected to a terminal connection pad 92 as a counter-terminal member that is formed on the top surface of the substrate 91 by soldering or the like. Moreover, the terminal connection pad 92 is connected to the top surface of the substrate 91 or to signal wires formed internally.

The arm part 51d functions as a cantilever shaped leaf spring member to bias contact part 51b elastically upward. Therefore, the contact part 51b is pressed to the contact pad 151 of the card 101, so contact between the contact part 51b and the contact pad 151 is securely maintained. Furthermore, an opening 11c that passes through across the thickness of the bottom wall part 11b is formed in a part that corresponds to the lower side of the arm part 51d and the contact part 51b in the bottom wall part 11b. Note that the opening 11c can be omitted as necessary.

Figure 1B:
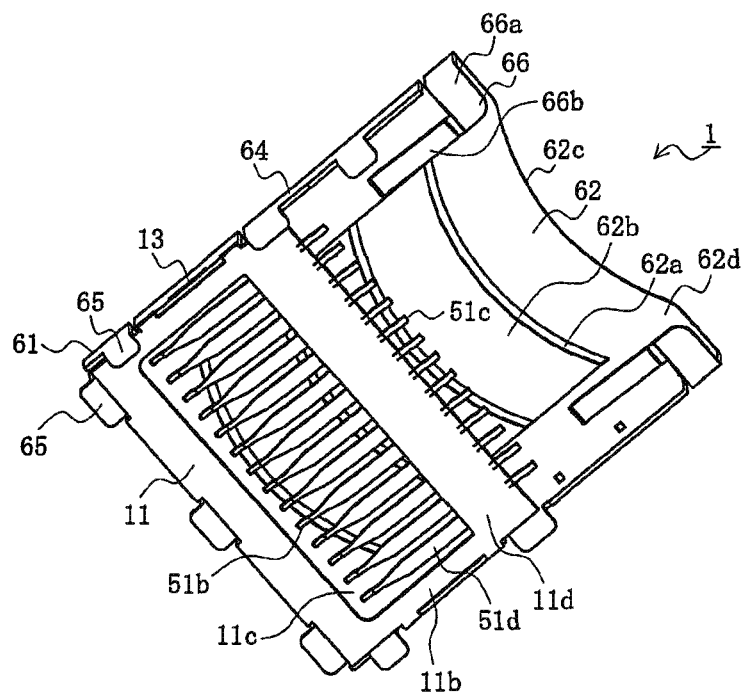

Further, the shell 61 has a top panel part 62 in substantially a rectangular shape, and a plurality of side panel parts 64 installed from the side edges in a plurality of locations (more specifically, both side edges and the back side edge) of the top panel part 62. A plurality of latch openings 63 are formed on the side panel parts 64, as illustrated in FIG. 1, and when the shell 61 is attached to the upper side of the housing 11, the latch opening 63 latches to the latching projection 13 formed on the outer surface of the bottom wall part 11b of the housing 11 so that the shell 61 is fixed to the housing 11. Also, a plurality of anchoring tabs 65 extend from the lower end edge of the side panel part 64 in a parallel direction with the top panel part 62. At least one of the anchoring tabs 65 is connected and anchored to the anchoring pad 93 arranged on the top surface of the substrate 91. Note that it is preferred that all of the anchoring tabs 65 are anchored by being connected to the anchoring pad 93.

The anchoring pad 93 is connected to the undersurface of the substrate 91 or to ground wires or the like formed internally. Herein, the ground wire of the substrate 91 is, for example, a plate-like member with a wide width made of metal with high heat conductivity, and it is preferable to be a member that functions as a heat radiating plate or a heat conducting plate. By doing so, the heat generated by the card 101 can be transferred to the ground wire through the top panel part 62, side panel part 64, anchoring tab 65, and anchoring pad 93 to be efficiently dissipated. In this case, the anchoring pad 93 functions as a heat transfer pad. In addition, the anchoring pad 93 only serves as a heat radiator or heat conductor and not a ground wire, and may be connected to a heat radiating or conducting plate that does not function as a ground line.

Further, some of the anchoring tabs 65 typically extend outward of the shell 61, and other anchoring tabs 65 extend inward of the shell 61. The anchoring tabs 65 extending inward of the shell 61 abut the bottom surface of the bottom wall part 11b of the housing 11 to demonstrate the function for anchoring the shell 61 to the housing 11.

Further, a plurality of slits 62a are formed in the top panel part 62 of the shell 61, and the expansion spring 62b is formed as a protruding spring part that protrudes facing downward in an area separated from the peripheral part 62d of the top panel part 62 by the slits 62a. Typically, the expansion spring 62b is a member that expands facing downward, and the slit 62a is formed a similar shape as the arch part 62c of the front side end of the top panel part 62, in other words, it is shaped in an arch shape with a center part that protrudes facing the interior side, and is formed in an even number (four in the example illustrated in the Figure). In addition, the expansion spring 62b is an area in which both end edges of the front to back direction thereof (the direction joining the upper left and lower right in FIG. 1(a)) is demarcated by a pair of slits 62a, and when viewed from above, is provided in an arched band-like shape that has a wide width and the center part protrudes facing to the interior side.

Figure 3A:
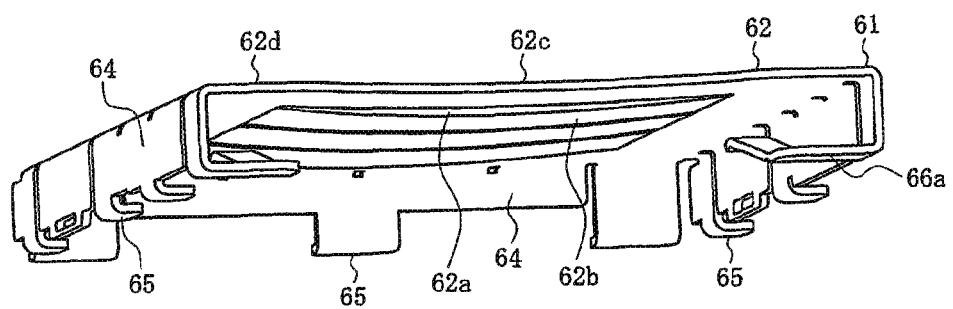
FIG. 3 is a view illustrating a shell of the card connector of FIG. 1, where (a) is a view seen diagonally from the lower front side, and (b) is a rear surface view.
Figure 3B:
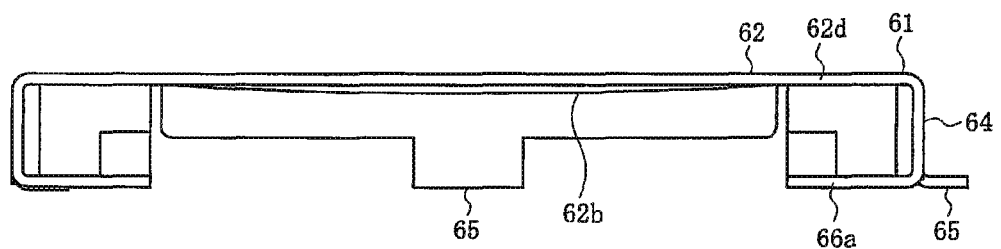

The expansion spring part 62b improves the contact state with the card 101 and improves the heat transfer from the card 101 to function as a contact improving part or a heat transfer improving part. Therefore, the expansion spring 62b is a simply supported beam shaped leaf spring member that relates to the width direction of the shell 61 and where both ends are connected to the peripheral part 62d, and, as illustrated in FIG. 3, expands facing downward so that the bottom surface thereof is positioned below the bottom surface of the peripheral part 62d.

Although the shell 61 is typically a member formed by a working process such as stamping or bending a metal plate, by nature, the top panel part 62, which is a flat panel, may slightly band so as to protrude facing upward, although slightly, caused by the spring back and the like at the time of the working process. In addition, when the top panel part 62 is curved so as to protrude facing upward, a portion (particularly, near the center part in the width direction) of the top surface 111c of the card 101 inserted into the card housing space between the housing 11 and the shell 61 can no longer abut the top panel part 62, and thus, the heat generated by the card 101 cannot be efficiently transferred to the top panel part 62.

Since the expansion spring 62b is formed, even if the top panel part 62 bends so as to protrude upward, and conversely, even if the top panel part 62 is a flat panel, the entire top surface 111c of the card 101 inserted into the card housing space can abut the top panel part 62, and thus, the heat generated by the card 101 can be efficiently transferred to the top panel part 62. Further, because the expansion spring 62b is provided in an arched band-like shape in which the center part protrudes facing the interior side, the length thereof is longer than the linearly joined length of both ends mutually connected to the peripheral part 62d. In other words, the length of the expansion spring 62b as a simply supported beam shaped leaf spring member where both ends are connected to the peripheral part 62d, that is to say, the spring length, is longer. Therefore, because the expansion spring 62b has a wide range that displaces in the vertical direction as a spring and has high elasticity, it can securely contact the top surface 111c of the card 101.

In addition, the top panel part 62 of the shell 61 is typically larger than the bottom wall part 11b of the housing 11 with the area thereof at a size of at least 80%, preferably at least 90%, and more preferably at least 95%, of the area of the upper surface 111c of the card 101. Further, the expansion spring 62b typically spans from the front to the back of the card 101 continuously contacting one side surface of the card number 101. Note that the slit 62a has an extremely narrow width, and the reduction in the area of the top panel part 62 by the formation of the slit 62a is negligible to the extent that it can be ignored.

In the example illustrated in the Figure, the top panel part 62 of the shell 61 has approximately twice the area of the bottom wall part 11b of the housing 11. Also, the shell 61 is attached on the upper side of the housing 11 so that the side panel part 64 installed from the back side edge of the top panel part 62 abuts the outer surface of the back wall part 11a, in other words, the back side edge of the top panel part 62 and the back side edge of the bottom wall part 11b substantially match. Therefore, the configuration is such that there is no housing 11 at the lower side portion of about the front half of the top panel part 62.

A card retention tab 66 is connected to the side panel part 64 on the front side edge of the shell 61. A base part 66a of the card retention tab 66 extends from the lower end edge of the side panel part 64 inward of the shell 61 parallel to the top panel part 62, and a supporting arm tab 66b extends from the front end side of the base part 66a towards the back wall side. The supporting arm tab 66b is a cantilever shaped leaf spring member with elasticity, and extends diagonally upward toward the back wall side. Note that the base part 66a, similar to the anchoring tabs 65, is connected and anchored to the anchoring pad 93 formed on the top surface of the substrate 91.

In addition, the tip of the supporting arm tab 66b contacts the heat dissipation pad 155 of the bottom surface 111d of the card 101. In this case, the supporting arm tab 66b functions as a cantilever shaped leaf spring member to bias the tip thereof elastically upward. Therefore, the tip of the supporting arm tab 66b is pressed to the heat dissipation pad 155 of the card 101, so contact with the heat dissipation pad 155 can be securely maintained.

Figure 4:
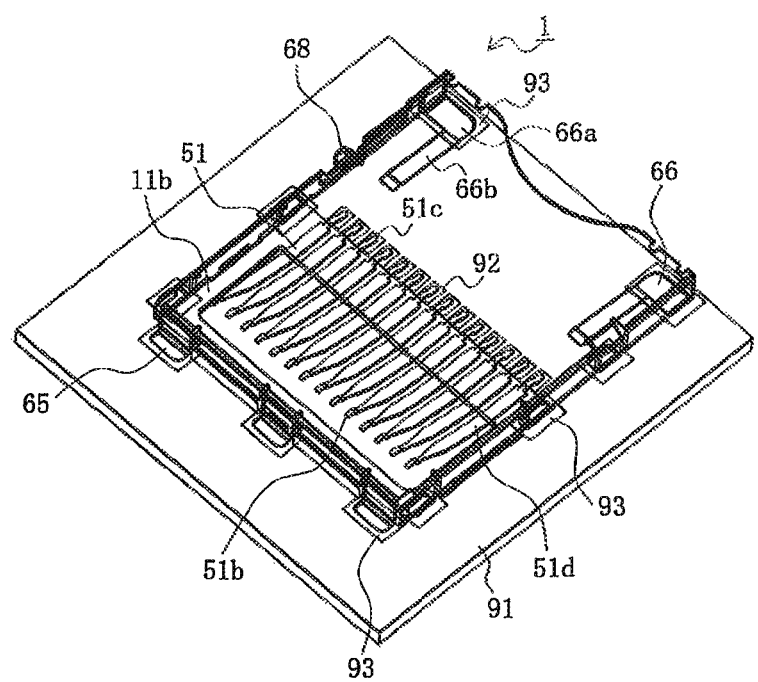
FIG. 4 is a perspective view illustrating the card connector of FIG. 1 in a mounted state on a substrate.

By doing so, the heat generated by the card 101 can be transferred from the heat dissipation pad 155 to the ground wire through the supporting arm tab 66b, the base part 66a, and the anchoring pad 93 to be efficiently dissipated. Further, because the tip of the supporting arm tab 66b is biased elastically upward to support the bottom surface 111d of the card 101 inserted into the card housing space between the housing 11 and the shell 61, the top surface 111c of the card 101 is pressed to the top panel part 62 of the shell 61 thereby stabilizing the disposition of the card 101 within the card housing space. Furthermore, the heat generated by the card 101 is efficiently transferred because the entire top surface 111c of the card 101 abuts the top panel part 62 of the shell 61. Moreover, the heat is transferred to the ground wire through the side panel part 64, the anchoring tab 65, and the anchoring pad 93 to be efficiently dissipated. Additionally, the shell 61 provides at least one locking member 68 formed on at least one side of the side panel part 64 of both the left and right sides as illustrated in FIG. 4. Here, for convenience, a description will be given where only one locking member 68 is formed on the right side panel part 64.

Note that the locking member 68 is a cantilever-shaped leaf spring member formed by a part of the side panel part 64 cut to protrude, and as will be described herein, the base end part thereof is provided with a lock main body part 68a is integrally connected to the side panel part 64, a locking ridged part 68b connected to the tip of the lock main body part 68a, and a flat shaped operating part 68c connected to the tip of the locking ridged part 68b. Also, the locking member 68 is elastically displaced in an orthogonal direction to the side panel part 64. Accordingly, the locking ridged part 68b of the locking member 68 is engaged by fitting into the recessed part 113 formed on the side edge 112 of the card 101 that is inserted in the card housing space between the housing 11 and shell 61. Therefore, the card 101 is securely locked and held.

Figure 7A:
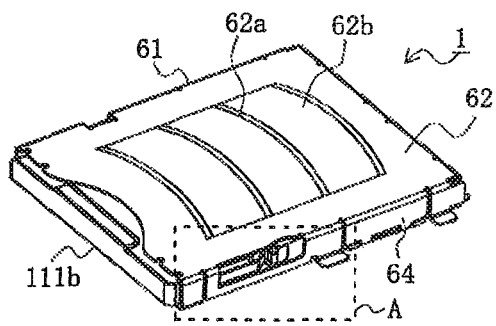
FIG. 7 is a view illustrating the state where the card inserted into the card connector of FIG. 1 is locked, where (a) is a perspective view, (b) is an enlarged view of the A part in (a), (c) is a perspective plan view, and (d) is an enlarged view of the B part in (c)
Figure 7B:
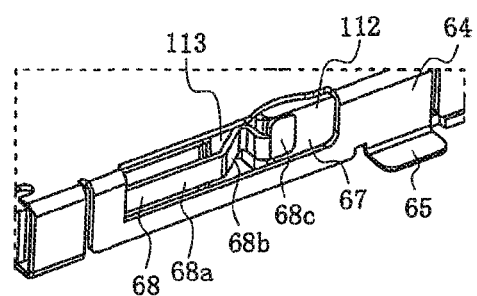

As illustrated in (b) in FIGS. 6-7, the locking member 68 formed in the shell 61 is provided with: a locking main body 68a in which the base end part thereof is integrally connected to the side panel part 64 and extends toward the back wall part 11a side (in the inserting direction of the card 101); a locking ridged part 68b formed by bending so as to protrude toward the inside of the shell 61 and is connected to the tip of the locking main body 68a; and a plate-shaped operating part 68c that is connected to the tip of the locking ridged part 68b. The operating part 68c is preferably formed so as to be substantially flush with the locking main body 68a. Accordingly, because the operating part 68c does not protrude from the side surface of the card connector, size reduction is possible without increasing the width of the card connector 1, and the processing of the locking member 68 is even easier. Note that the periphery of the locking member 68 is made of the opening 67 where a portion of the shell 61 is removed. Also, the locking member 68 is elastically displaced in an orthogonal direction to the side panel part 64.

Further, as illustrated in (d) in FIGS. 6-7, the locking ridged part 68b of the locking member 68 is provided with a locking part 68b1 that is substantially orthogonal to the locking main body 68a and the surface of the operating part 68c, and a sloping part 68b2 that extends in a sloping direction toward the surface, and the shape as viewed from above is substantially a right triangle. In the right triangle, a ridged vertex part 68b3 positioned between the side corresponding to the locking part 68b1 and the side corresponding to the sloping part 68b2, is an acute angle, and the vertex positioned between the side opposing the ridged vertex part 68b3 and the side corresponding to the locking part 68b1 is substantially at a right angle. Note that in the initial state where the card 101 is not yet inserted, the locking main body 68a and the surface of the operating part 68c are almost flush with the side panel part 64 of the periphery.

When inserting the card 101, the user inserts the card 101 into the card housing space formed between the housing 11 and the shell 61 from the front side (lower left side in FIG. 6 (a)) of the card connector 1. Note that the card 101 is inserted in a disposition so that the bottom surface 111d on which the contact pad 151 is arranged opposes the bottom wall part 11b of the housing 11, the top surface 111c on which the contact pad 151 is not arranged opposes the top panel part 62 of the shell 61, and the front end 111a faces toward the back wall part 11a of the housing 11. Thereby, the card 101 advances along the side edge 112 where the recessed part 113 is formed, in other words, along the right side edge 112 there is the side panel part 64 where the locking member 68 is formed in the shell 61, while along the other side edge 112, that is the left side edge 112, there is the side panel part 64 where the locking member 68 is not formed in the shell 61. In short, the card 101 advances in the manner where both left and right side-edges 112 are guided by the side panel parts 64 on both the left and right sides in the shell 61.

In addition, FIG. 6 illustrates the initial stage in the inserting process of the card 101, and it illustrates the state where only the front end 111a and its proximity are inserted into the card housing space, and it illustrates the state when the front end 111a reaches the near side of the locking ridged part 68b of the locking member 68. Further, with the top panel part 62 of the shell 61, although the expansion spring 62b expands facing downward, because the expansion amount is very slight, the card 101 catching on the expansion spring 62b during the insertion process of the card 101 in actuality does not occur.

Subsequently, when the card 101 is pushed further in from the state illustrated in FIG. 6, the right side edge 112 of the card 101 abuts the locking ridged part 68b of the locking member 68, and the locking member 68 displaces to the outside direction (right direction in FIGS. 6(c)-(d)) of the shell 61. When the right side edge 112 of the card 101 abuts the locking ridged part 68b of the locking member 68, the locking member 68 first abuts the sloping part 68b2 and thus can be smoothly displaced to the outside direction of the shell 61. Accordingly, the card 101 can advance without receiving much resistance from the locking member 68, and can be easily pushed.

Furthermore, for the advancing direction of the card 101, the locking ridged part 68b is positioned farther rearward than the area where the locking main body 68a is connected to the side panel part 64. In other words, the locking ridged part 68b is positioned to the trailing side of the locking member 68 that is the cantilever shaped leaf spring member. Therefore, the card 101 can displace the locking ridged part 68b to the outside direction of the shell 61 without resistance. Accordingly, the card 101 can advance extremely smoothly, and can be easily pushed in. Further, the front end 111a of the card 101 either abuts or draws near to the back wall part 11a of the housing 11 as well as the side panel part 64 of the back side of the shell 61 to be in the state illustrated in FIG. 7; and thus completing the insertion of the card 101 into the card connector 1.

Figure 8:
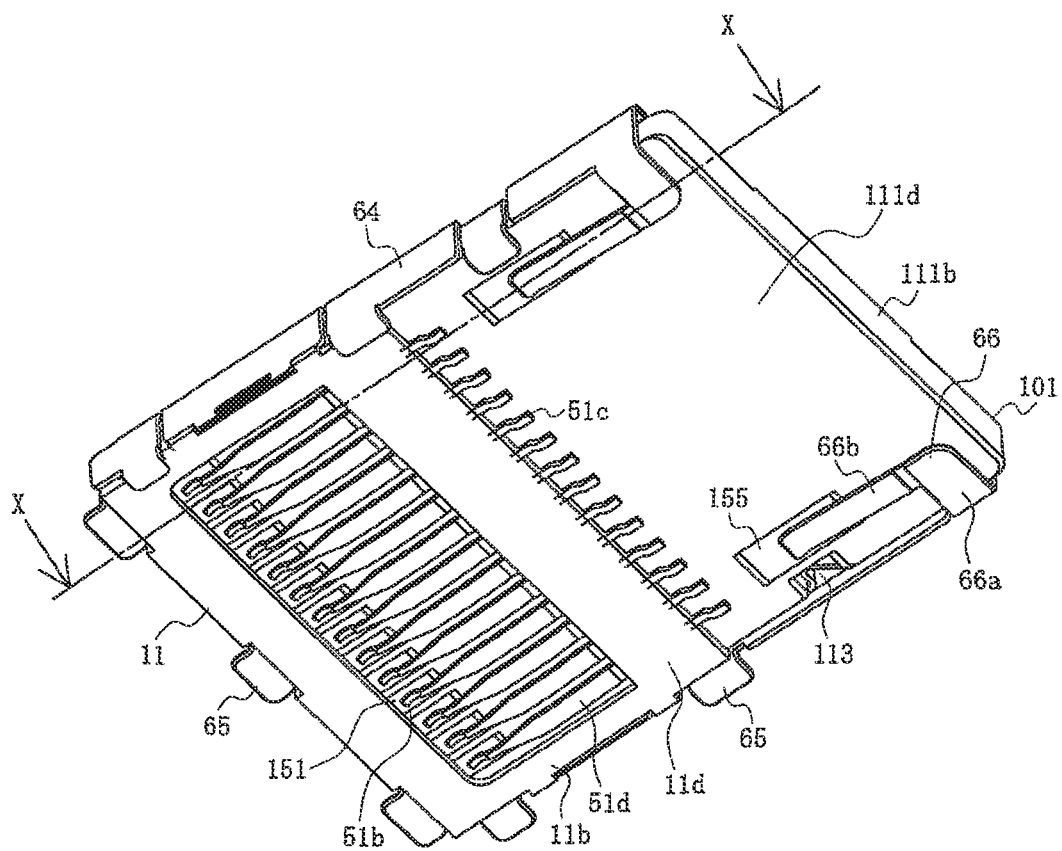
FIG. 8 is a perspective view illustrating a state in which the card inserted into the card connector of FIG. 1 is locked.

With this state, the contact parts 51b of the corresponding terminals 51 contact each of the contact pads 151 of the card 101, as illustrated in FIG. 8, to be electrically connected. Further, nearly the entire top surface 111c of the card 101 is covered by the top panel part 62 of the shell 61, and nearly the entire surface of the side edges 112 of both the left and right sides of the card 101 either abuts or draws near to the side panel parts 64 of both the left and right sides in the shell 61. Accordingly, the disposition of the card 101 within the card connector 1 is stabilized, and the electrical connection between the contact pads 151 and the terminals 51 can be maintained.

Figures 9A, 9B:
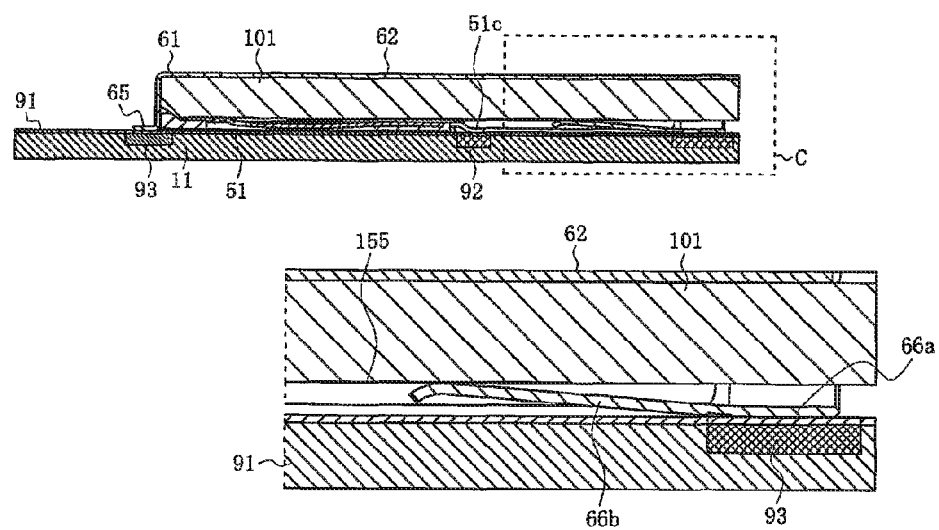
FIG. 9 is a is a cross-sectional view illustrating a state in which the card inserted into the card connector of FIG. 1 is locked, and is a cross-sectional view along Arrow X-X in FIG. 8, where (a) is a cross-sectional view along Arrow X-X, and (b) is an enlarged view of the C part in (a)

Further, a part that is about a half of the back end 111b side of the card 101 has the heat dissipation pad 155 arranged on the bottom surface 111d, and is biased upward by the card retention tab 66; and a part that is about a half of the front end 111a side of the card 101 has the contact pad 151 arranged on the bottom surface 111d, and is biased upward by the terminals 51, so nearly the entire top surface 111c of the card 101 is pressed to the top panel part 62 direction of the shell 61, as illustrated in FIG. 9(a). Therefore, the disposition of the card 101 within the card connector 1 is further stabilized.

Further, because the near entirety of the top surface 111c of the card 101 is pressed to the top panel part 62 of the shell 61, the heat generated by the card 101 is efficiently transferred from the top surface 111c to the top panel part 62 and further transferred to the ground wire through the side panel part 64, the anchoring tab 65, and the anchoring pad 93 and is efficiently dissipated. Additionally, because the expansion spring 62b is formed on the top panel part 62 of the shell 61 and the expansion spring 62b elastically deforms, the near entirety of the bottom surface of the top panel part 62 abuts with the near entirety of the top surface 111c of the card 101 to enable the heat generated by the card 101 to be efficiently transferred to the top panel part 62.

Note that the card 101 has a low dimensional accuracy and there is a possibility for variance to occur in the thickness of the card 101 (the space between the top surface 111c and the bottom surface 111d). However, the card retention tab 66 and the terminals 51 function as a cantilever shaped leaf spring to bias the card 101 upward. Therefore if there is variance in the thickness of the card 101, the near entirety of the top surface 111c of the card 101 securely abuts the top panel part 62 of the shell 61. Further, because the expansion spring 62b elastically deforms, the near entirety of the bottom surface of the top panel part 62 securely abuts the near entirety of the top surface 111c of the card 101. Accordingly, the heat generated by the card 101 is efficiently transferred from the top surface 111c to the top panel part 62.

Similarly, if there is variance in the thickness of the card 101, because the tip of the supporting arm tab 66b of the card retention tab 66 is pressed to the heat dissipation pad 155 of the card 101 and contact with the heat dissipation pad 155 is securely maintained, the heat generated by the card 101 is transferred from the heat dissipation pad 155 to the ground wire through the supporting arm tab 66b, the base part 66a, and the anchoring pad 93 and is efficiently dissipated. In addition, the locking ridged part 68b of the locking member 68 fits into and engages the recessed part 113 formed on the side edge 112 of the card 101. Therefore, the card 101 is securely locked and held within the card connector 1.

Figures 7C, 7D:
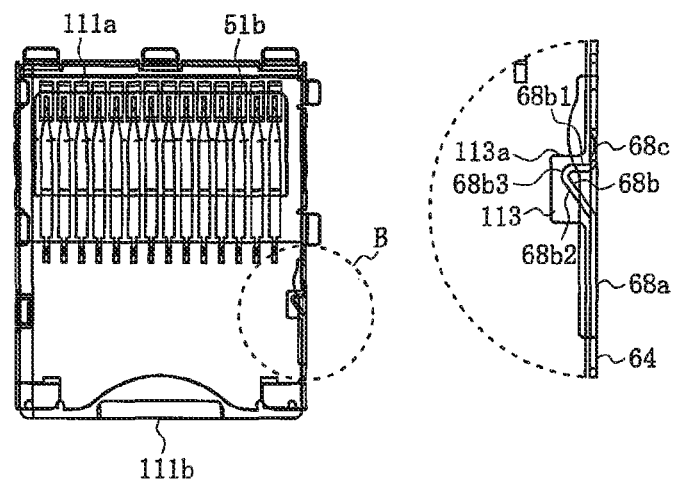

As illustrated in FIG. 7(d), the recessed part 113 is provided with a lock receiving part 113a that is a substantially orthogonal to the side edge 112, and the shape is substantially a rectangular shape when viewed from above. The lock receiving part 113a is a surface near the front end 111a in the recessed part 113 and is an area opposing the locking part 68b1 in a state where the locking ridged part 68b fits into the recessed part 113. Therefore, if an external force is applied to the card 101 in a direction to remove it from the card housing space, the card 101 cannot move any farther in the opposite direction to the insertion direction because the lock receiving part 113a of the recessed part 113 abuts and locks in the locking part 68b1 of the locking ridge part 68b. Accordingly, this can not only prevent disconnection from the card connector 1 by coming out from the card housing space, but can also prevent the release of the contact state between the contact pad 15 and the terminals 1.

When the locking ridged part 68b is fit into the recessed part 113, the surfaces of the locking main body 68a and the operating part 68c are substantially flush with the peripheral side panel part 64 in a similar manner to the initial state. Accordingly, the locking part 68b1 that is substantially orthogonal to the surfaces of the locking main body part 68a and the operating part 68c is substantially orthogonal to the side panel part 64. Meanwhile, the side edge 112 of the card 101 is substantially parallel to the side panel part 64 due to being guided by the side panel part 64. Accordingly, the lock receiving part 113a that is substantially orthogonal to the side edge 112 is substantially orthogonal to the side panel part 64. Thereby, the locking part 68b1 of the locking ridged part 68b and the lock receiving part 113a of the recessed part 113 are mutually parallel and at the same time nearly orthogonal to the side panel part 64, in other words, the locked state cannot be released due to the substantially orthogonal insertion direction.

Furthermore, because the locking ridged part 68b is positioned farther rearward than the area where the locking main body 68a is connected to the side panel part 64 for the advancing direction of the card 101, it is positioned farther forward than the area where the locking main body 68a is connected to the side panel part 64 for the opposite direction to the advancing direction of the card 101. In other words, when the card 101 is pulled out from the card housing space, the locking ridged part 68b is positioned to the leading side of the locking member 68 that is the cantilever shaped leaf spring member. Therefore, when an external force in the retraction direction is applied to the card 101, a force in the penetration direction into the recessed part 113 acts on the locking ridged part 68b. In short, a force that displaces to the left direction acts on the locking ridged part 68b in FIG. 7(b). Therefore, the locking ridged part 68b is not displaced to the outer direction of the shell 61, so the locked state between the locking part 68b1 of the locking ridged part 68b and the lock receiving part 113a of the recessed part 113 does not release.

Note that the card 101 has a low dimensional accuracy, and there is a possibility for variance to occur in the position of the recessed part 113 in regard to the front and back directions of the card 101. In this case, when the locking ridged part 68b of the locking member 68 fits into the recessed part 113 in a locked state and a variance occurs in the position of the card 101 within the card connector 1. As a result, a variance also occurs in the position of the contact pad 155 and the heat dissipation pad 150 in regard to the insertion and removal direction of the card 101. However, as illustrated in FIG. 5(b), the contact pad 151 and the heat dissipation pad 155 are provided with a long and narrow shape in the front to back direction of the card 101, and therefore when a variance occurs in the position of the card 101 within the card connector 1 in regard to the insertion and removal direction of the card 101, contact between the contact part 51b of the terminals 51 and the supporting arm tab 66b of the card retention tab 66 is maintained.

Further, when the card 101 is removed from the card connector 1, the operating part 68c is displaced in the outer direction of the shell 61 to release the locked state between the locking part 68b1 of the locking ridged part 68b and the lock receiving part 113a of the recessed part 113. Subsequently, the near back end 111b of the card 101 is held, and pulls out the card 101 from the card housing space while keeping the operating part 68c displaced to the outer direction of the shell 61. Accordingly, the card 101 can be removed easily and quickly from the card connector 1.

In this manner, the shell 61 is provided with a top panel part 62, a plurality of side panel parts 64 installed from the side edges of the top panel part 62, anchoring tabs 65 that extend from the bottom end edge of the side panel part 64, and at least one of the anchoring tabs 65 is connected to the anchoring pad 93 arranged on the substrate 91, and the top panel part 62, that contacts the top surface 111c of the card 101 housed in the card housing space, is provided with an expansion spring 62b a heat transfer improving part to improve heat transfer from the card 101 to the top panel part 62. By so doing the card connector 1 can have a small size and simple configuration, and yet can quickly remove the heat generated by the card 101 by transferring the heat through the shell 61.

Further, the shell 61 is provided with the card retention tab 66 connected to the bottom end edge of the side panel part 64, and the card retention tab 66 biases the bottom surface 111d of the card 101 housed in the card housing space upward to abut the top surface 111c of the card 101 to the expansion spring 62b as a heat transfer improving part. Thereby, because the top surface 111c of the card 101 securely abuts the expansion spring 62b as the heat transfer improving part, and the heat generated by the card 101 can be more securely transferred and removed.

Further, the expansion spring 62b as the heat transfer improving part, is separated from the peripheral part 62d of the top panel part 62 by the slits 62a and expand facing downward. Thereby, the bottom surface of the entire top panel part 62 that includes the expansion spring 62b abuts the entire top surface 111c of the card 101, and the heat generated by the card 101 can be efficiently transferred to the top panel part 62. Further, the expansion spring 62b is connected at both ends thereof to the peripheral part 62d and is a simply supported beam shaped leaf spring member that extends in the width direction of the shell 61, and an arched band-like shape is provided at the center part thereof facing the inner side, which is to say that it protrudes toward the insertion direction of the card 101.

Therefore, because the expansion spring 62b has a long spring length, a wide range that displaces in the vertical direction as a spring, high elasticity, it can securely contact with the top surface 111c of the card 101. In addition, the card 101 is provided with the heat dissipation pad 155 that is arranged on the bottom surface 111d thereof, and the card retention tab 66 abuts the heat dissipation pad 155. Accordingly, the heat generated by the card 101 can be more quickly removed by transferring also through the heat dissipation pad 155 and the card retention tab 66.

In addition, the contact pad 151 is arranged on the bottom surface 111d on the front end 111a side half portion on the card 101 and is upwardly biased by the terminals 51. The heat dissipation pad 155 is arranged on the bottom surface 111d on the back end 111b side half portion on the card 101 and is upwardly biased by the card retention tab 66. Thereby, because nearly the entire top surface 111c is pressed to the top panel part 62 of the shell 61, the disposition of the card 101 housed in the card housing space is stabilized, and the heat generated by the card 101 is efficiently transferred and removed from the top surface 111c to the top panel part 62.

Next, a description will be given of another embodiment of the Present Disclosure. In addition, the description will omit the explanation for those items with the same structure as the previous embodiment but will give the same reference numbers. Further, regarding the same operation and effects as the previous embodiment, such description will be also omitted.

In this embodiment, a plurality of slits 62e are formed in the top panel part 62 of the shell 61, and a raised leaf part 62f is formed as a protruding spring part that protrudes facing downward in an area separated from the peripheral part 62d of the top panel part 62 by the slits 62e. The raised leaf part 62f is a cantilever shaped member in which, typically, the base end, in other words, the back end, is connected to the peripheral part 62d, while the free end. In other words, the front end protrudes facing downward, and the slit 62e is formed in an arc shape where the center part protrudes facing the interior side.

In addition, the raised leaf parts 62f, compared to the extension springs 62b in the first embodiment, each have an extremely small size and are formed in an extremely numerous quantity (85 units in the example illustrated in the Figures) and are arranged in a lattice. As a whole, the raised leaf parts 62f are formed and arranged similar to the scales of a fish. In other words, they are formed in a fish scale pattern. Note that the number of raised leaf parts 62f and the manner of arrangement may be suitably modified. The raised leaf part

Figure 11A:
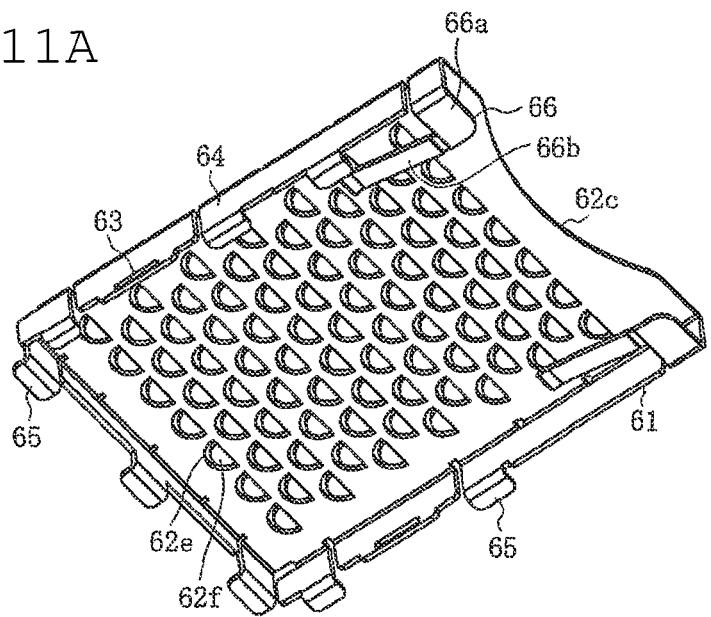
FIG. 11 is a perspective view of a shell of the card connector of FIG. 10 diagonally viewed from below, where (a) and (b) are views from mutually different angles.
Figure 11B:
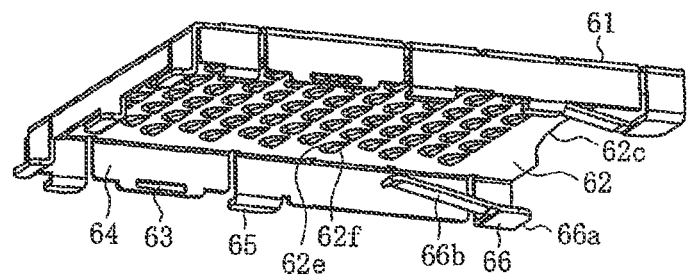
Figure 12:
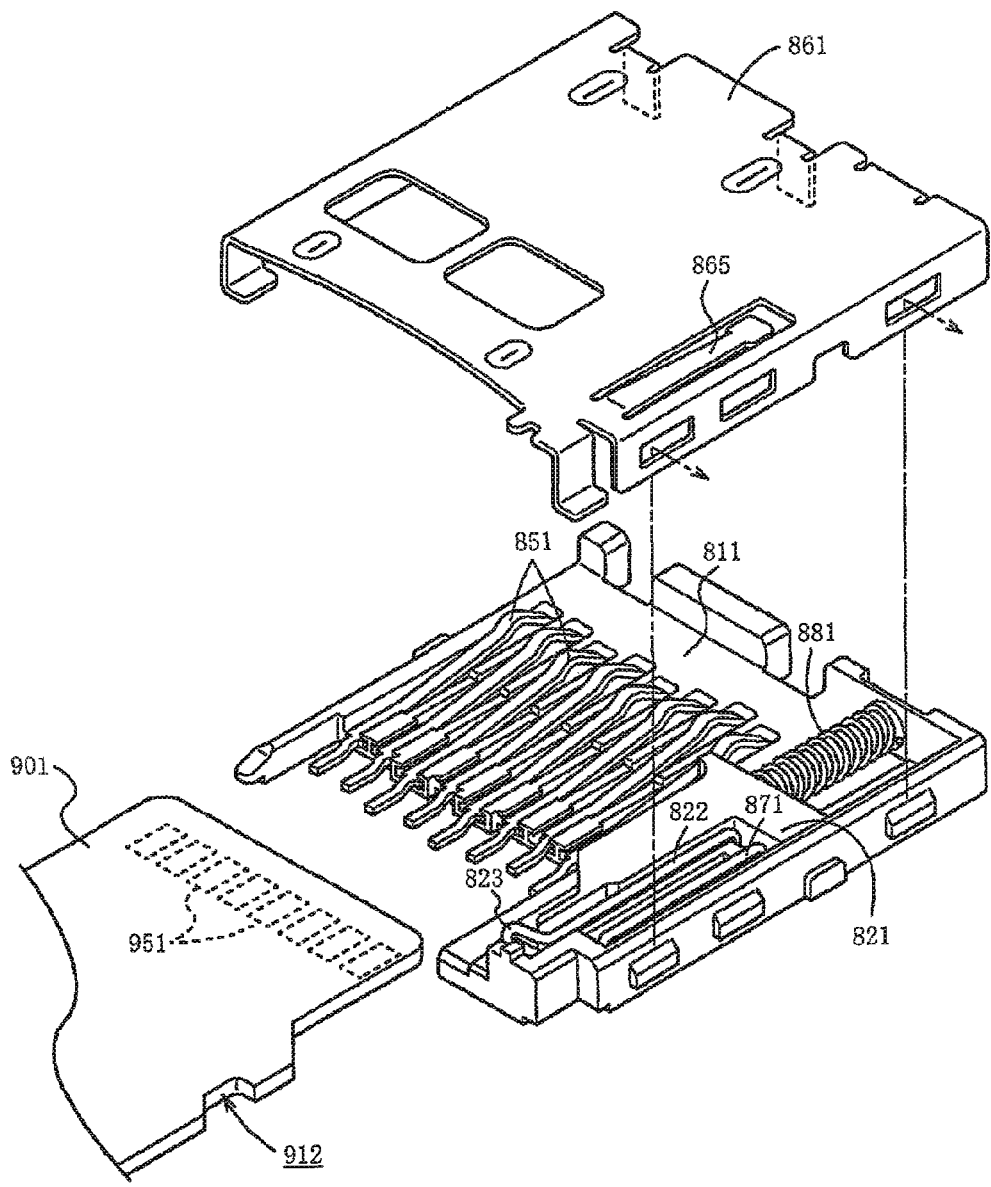
FIG. 12 is a view illustrating a conventional card connector.

62f, similar to the expansion spring part 62b in the previous embodiment, improves the contact state with the card 101 and improves the heat transfer from the card 101 to function as a contact improving part or a heat transfer improving part. Therefore, the raised leaf part 62f is a cantilever shaped leaf spring member in which the back end (the end that is opposite to the insertion direction side of the card 101) is connected to the peripheral part 62d, and protrudes facing downward as illustrated in FIG. 11, so that the front end thereof (the end that is in the insertion direction side of the card 101) is positioned below the bottom surface of the peripheral part 62d.

In this embodiment, because the raised leaf part 62f is formed, even if the top panel part 62 bends so as to protrude upward, the entire top surface 111c of the card 101 inserted into the card housing space can abut the top panel part 62, and thus, the heat generated by the card 101 can be efficiently transferred to the top panel part 62. Further, because the raised leaf part 62f is a cantilever shaped leaf spring member that is elastically formed, and because the top panel part 62, being an original flat panel, is formed by the top surface 111c of the card 101 that is inserted into the card housing space and the bottom surface thereof being substantially flush with the bottom surface of the peripheral part 62d, the bottom surface of the entire top panel part 62 including the raised leaf parts 62f abuts the entire top surface 111c of the card 101, and thus, the heat generated by the card 101 can be efficiently transferred to the top panel part 62.

Because the raised leaf parts 62f each have an extremely small size and are arranged in an extremely numerous quantity (in other words, they are formed in a fish scale pattern), even if the top panel part 62 locally bends so as to protrude upward, the entire top surface 111c of the card 101 inserted into the card housing space can abut the top panel part 62, and thus, the heat generated by the card 101 can be efficiently transferred to the top panel part 62. Further, even if the top surface 111c of the card 101 is not flat due to a low dimensional accuracy, or if asperity is formed on the top surface 111c of the card 101, because each of the raised leaf parts 62f are formed to accommodate localized asperity on the top surface 111c of the card 101, the entire top surface 111c of the card 101 can securely contact the top panel part 62.

Note that the raised leaf part 62f typically spans from the front to the back of the card 101 continuously contacting one side surface of the card number 101. In addition, the slit 62e has an extremely narrow width, and the reduction in the area of the top panel part 62 by the formation of the slit 62e is negligible to the extent that it can be ignored.

The structure and operation of other points are the same as the first embodiment, therefore descriptions thereof are omitted.

While a preferred embodiment of the Present Disclosure is shown and described, it is envisioned that those skilled in the art may devise various modifications without departing from the spirit and scope of the foregoing Description and the appended Claims.

What is claimed is:

1. A card connector, comprising:
   a housing that houses a card provided with a terminal member;
   a connecting terminal attached to the housing that connects with the terminal member of the card;
   a cover member connected to the housing and which forms a card housing space between the housing; and
   a card connector attached to a substrate;
   wherein:
   the cover member comprises a top panel part, a plurality of side panel parts established from the side edge of the top panel part, and a fixed side that extends from the bottom end edge of the side panel part;
   at least one of the fixed sides is connected to a heat transfer pad arranged on the substrate; and
   the top panel part contacts the top surface of the card housed within the card housing space and is provided with a heat transfer improving part that improves heat transfer from the card to the top panel part.

2. The card connector of claim 1, wherein the heat transfer improving part is a protruding spring part that protrudes facing downward separated from the peripheral part of the top panel part by slits.

3. The card connector of claim 1, wherein:
   the card provides a heat dissipation pad arranged on the bottom surface thereof, and the card retention tab abuts the heat dissipation pad;
   the terminal member:
      is arranged on the bottom surface on the front end side half portion on the card; and
      is upwardly biased by the connection terminal; and
   the heat dissipation pad is arranged on the bottom surface on the back end side half portion on the card, and is upwardly biased by the card retention tab.

4. The card connector of claim 1, wherein the cover member is provided with a card retention tab that is connected to the bottom end edge of the side panel part.

5. The card connector of claim 4, wherein the card retention tab upwardly biases the bottom surface of the card housed in the card housing space and abuts the top surface of the card on the heat transfer improving part.

6. The card connector of claim 5, wherein the heat transfer improving part is a protruding spring part that protrudes facing downward separated from the peripheral part of the top panel part by slits.

7. The card connector of claim 6, wherein the protruding spring part is connected to the peripheral part by both ends.

8. The card connector of claim 7, wherein the protruding spring part is an expansion spring with a simply supported beam shape that extends in the width direction of the cover member.

9. The card connector of claim 8, wherein the center of the protruding spring part is provided in an arched band-like shape protruding toward the insertion direction of the card.

10. The card connector of claim 9, wherein the card provides a heat dissipation pad arranged on the bottom surface thereof, and the card retention tab abuts the heat dissipation pad.

11. The card connector of claim 10, wherein the terminal member is arranged on the bottom surface on the front end side half portion on the card.

12. The card connector of claim 11, wherein the terminal member is upwardly biased by the connection terminal.

13. The card connector of claim 11, wherein the heat dissipation pad is arranged on the bottom surface on the back end side half portion on the card, and is upwardly biased by the card retention tab.

14. The card connector of claim 6, wherein the protruding spring part is a raised leaf part formed in a fish scale pattern.

15. The card connector of claim 14, wherein and the opposite side end of the insertion direction of the card is connected to the peripheral part.

16. The card connector of claim 15, wherein the insertion direction side end of the card protrudes facing downward.

17. The card connector of claim 16, wherein the card provides a heat dissipation pad arranged on the bottom surface thereof, and the card retention tab abuts the heat dissipation pad.

18. The card connector of claim 17, wherein the terminal member is arranged on the bottom surface on the front end side half portion on the card.

19. The card connector of claim 18, wherein the terminal member is upwardly biased by the connection terminal.

20. The card connector of claim 19, wherein the heat dissipation pad is arranged on the bottom surface on the back end side half portion on the card, and is upwardly biased by the card retention tab.

* * * * *